United States Patent [19]
Amabile et al.

[11] Patent Number: 4,578,407
[45] Date of Patent: Mar. 25, 1986

[54] THIXOTROPIC RUST REMOVAL COATING AND PROCESS

[75] Inventors: Robert N. Amabile, Garfield; Richard E. Judd, Bloomingdale; Stanley J. Gromelski, Jr., West Caldwell, all of N.J.

[73] Assignee: GAF Corporation, Wayne, N.J.

[21] Appl. No.: 364,117

[22] Filed: Mar. 31, 1982

[51] Int. Cl.$^4$ ............ B08B 7/00; C11D 3/37; C11D 7/32; C08L 5/00
[52] U.S. Cl. ................. 524/55; 524/112; 29/81 R; 134/2; 134/3; 134/4; 134/41; 252/174.24; 252/524; 252/527; 252/DIG. 2; 252/DIG. 3
[58] Field of Search .......... 524/55, 112; 29/81 R; 134/2, 3, 4, 41, 42; 252/174.23, 174.24, 142, 524, 527, 542, 546, DIG. 2, DIG. 3, DIG. 14

[56] References Cited

U.S. PATENT DOCUMENTS

| | | |
|---|---|---|
| 3,448,088 | 6/1969 | Azorlosa .................... 526/271 |
| 3,492,238 | 1/1970 | Wohlberg ..................... 134/41 |
| 3,729,423 | 4/1973 | Hirota ........................ 252/142 |
| 3,810,784 | 5/1974 | Wong et al. ............ 117/126 GE |
| 4,250,048 | 2/1981 | Leveskis ....................... 134/3 |
| 4,325,744 | 4/1982 | Panayappan et al. .......... 134/41 |
| 4,336,145 | 6/1982 | Briscoe ......................... 524/55 |

Primary Examiner—John Kight
Assistant Examiner—Nathan M. Nutter
Attorney, Agent, or Firm—Joshua J. Ward; Marilyn J. Maue

[57] ABSTRACT

Spreadable thixotropic coating composition suitable for rust removal and containing polyvinylpyrrolidone, water and a thixotropic agent which is either xanthan gum or water-soluble crosslinked interpolymer of maleic anhydride, monovinyl alkyl ether and crosslinking agent. The composition has a pH between about 1.5 and 7.0 is applied to rusty metal surfaces and allowed to dry. During drying the rust becomes incorporated into the coating which is then easily removed.

14 Claims, No Drawings

THIXOTROPIC RUST REMOVAL COATING AND PROCESS

BACKGROUND OF THE INVENTION

Adequate removal of rust from metal surfaces in preparation for the application of paint or other protective coatings is a long standing problem. Mechanical cleaning techniques such as sand blasting, wire brush scrubbing, etc. are messy and time consuming. Previous attempts to chemically clean rusty surfaces have not been entirely satisfactory.

One particularly difficult type of metal surface to clean is the irregular surfaces found on ships, i.e., high-temperature valves, pipes, and the like. Frequently, the only cleaning method feasible is the lengthy and tiresome process of wire brushing the surface to be cleaned and then subsequently applying a solution of a wetting agent mixed with a cleaning agent to the metal surface. Such a technique suffers from the difficulty of keeping the cleaning fluid in contact with the surface to be cleaned, such as overhead objects, as well as the subsequent disposal of liquid wastes. Additionally, these solutions are often toxic, non-economical, and require large volumes of water for washing purposes.

Previous attempts to chemically remove rust have involved the use of chemicals such as inhibited hydrochloric acid, ethylenediaminetetraacetic acid (EDTA), EDTA/citric acid, etc. More recently it has been suggested that a paste of water-soluble polymers such as polyvinylpyrrolidone (PVP) and a chelating agent such as EDTA be coated onto a rusty metal surface to be cleaned. After application the paste is said to harden into a thick crust which encapsulates the rust and may be peeled from the cleaned surface and disposed of as solid waste. This process is more fully described in U.S. Pat. No. 4,325,744.

SUMMARY OF THE INVENTION

Coating composition of the invention is a spreadable thixotropic coating composition having a pH between 1.5 and 7.0, said composition being suitable for removing rust from metal surfaces and consisting essentially of:

(a) an effective film forming and rust removing amount of polyvinylpyrrolidone;

(b) an effective solvent amount of water; and (c) an effective thixotropic amount of xanthan gum or of a water-soluble crosslinked interpolymer consisting essentially of substantially equimolar quantities of maleic anhydride and monovinyl alkyl ether wherein the alkyl group contains from 1 to 4 carbon atoms and 0.001 to 0.2 mole per mole of the monovinyl alkyl ether of a crosslinking agent having a formula selected from the class consisting of

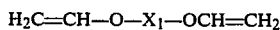

$$H_2C=CH-O-X_1-OCH=CH_2$$

and

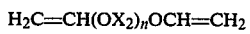

$$H_2C=CH(OX_2)_nOCH=CH_2$$

where $X_1$ represents an alkylene group of two to twelve carbon atoms and $X_2$ represents an alkylene group of two to four carbon atoms and n represents an integer of 2 to 100.

Acid is also preferably included in an amount sufficient to maintain pH of the composition between about 1.5 and about 3.

The invention also includes a process for removing rust from a rusty metal surface which comprises:

(a) applying thixotropic coating composition of claim 1 to said surface to form a coating thereon;

(b) allowing said coating to dry, whereby rust becomes incorporated into the coating; and (c) removing the dried coating containing rust from the metal surface.

FIELD OF INVENTION

The invention relates to removal of rust from metal surfaces and more particularly to coating compositions and methods suitable for this purpose.

DETAILED DESCRIPTION OF THE INVENTION

Coating composition of the invention contains polyvinylpyrrolidone (PVP), water and a thixotropic agent which is either xanthan gum or a crosslinked interpolymer of the type described above. Acid is a preferred but not essential ingredient. The composition is used in the form of a paste-like gel which has thixotropic properties so that it can be easily spread on the rust coated surface. As the coating dries the rust becomes incorporated into the coating. Depending upon a number of factors including the exact composition of the coating used, atmospheric humidity, etc. the coating dries to a tough film which contains all or most of the rust and which can be easily peeled from the metal surface or to a hard, brittle film which flakes off easily and which again contains all or most of the rust.

While the mechanism by which coating compositions of the invention function to incorporate the rust into the coating is not fully understood, it is believed that the coating composition soaks into and complexes the rust with the film forming properties of the coating being such that the film of dried coating detaches easily from the metal surface. In general, the PVP acts principally as a film former and also aids significantly in rust removal ability. The interpolymer or xanthan gum functions as a thixotropic agent so that the coating can be applied in desired thicknesses even to vertical or overhead surfaces without excessive dripping or flowing. The interpolymer also tends to render the coating formulation somewhat less sensitive to moisture due to its film stiffening characteristics. Acid (when used) reacts when used with the rust and helps to strip the rust from the metal surface as well as maintaining desired pH and the water serves as the solvent in which the other ingredients are dissolved. In a preferred embodiment coating compositions of the invention have a pH between about 1.5 and about 3 and include between about 10 and about 40 weight percent (wt %) PVP, between about 2 and about 15 wt % acid between about 3 and about 15 wt % thixotropic agent and between about 30 and about 85 wt % water.

It will be appreciated that proportions of ingredients used in formulations of the invention may be varied widely and that many different combinations of specific proportions exist which will yield coatings of suitable spreadability and flow characteristics. In this respect it is especially important for preferred embodiments of the invention that the flow characteristics of the coating be such that desired thicknesses of coating can be applied to and maintained on the rust covered surfaces and that no dripping occur. To meet this requirement it is generally preferred that coating compositions of the invention have glass plate flow rates of not more than about 1 mm per minute as measured on a 66° inclined glass plate maintained at room temperature for samples coated onto the plate by a doctor blade to a 1.27 mm thickness. The samples are coated with the plate in a horizontal position and the plate is then inclined and flow rate and distance traveled until drying occurs (glass plate flow distance) are reported. Glass plate flow distances as determined by this test are preferably less than about 12 mm. Depending upon the amounts of various ingredients used, the thixotropic properties of the composition may be such that the composition may be spread e.g. with a paint brush or such that e.g. a putty knife must be used. A particularly preferred composition of relatively high yield value adapted for application by knife edge, putty knife, etc. contains between about 15 and about 25 wt % PVP, between about 4 and about 6 wt % acid, between about 5 and about 10 wt % interpolymer and between about 60 and about 75 wt % water.

While almost any PVP may be used in formulating compositions of the invention, it is generally preferred that the K value of PVP used be between about 30 and about 120 with K values between about 30 and about 90 being preferred for the most preferred embodiments of the invention.

Interpolymers are preferred thixotropic agents for use in the invention and may be prepared by conventional known methods, for example by interpolymerizing maleic anhydride and a mixture of the monovinyl ether and divinyl ether of an aliphatic diol using approximately one mole of maleic anhydride per mole of the monovinyl ether moiety. These interpolymers and methods for preparing them are described more fully in U.S. Pat. No. 3,448,088 the disclosure of which is incorporated herein by reference. Preferred interpolymers are those in which the monovinyl alkyl ether is methyl vinyl ether or ethyl vinyl ether and in which the cross-linking agent has the formula

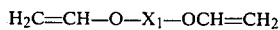
$$H_2C=CH-O-X_1-OCH=CH_2$$

where $X_1$ represents a butylene group or the formula

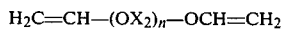
$$H_2C=CH-(OX_2)_n-OCH=CH_2$$

where $X_2$ represents ethylene and n is 2. A particularly suitable interpolymer is available from GAF Corporation under the tradename GAFTEX PT. In this interpolymer the monovinyl ether is methyl vinyl ether and the crosslinking agent is divinyl butyl ether used in an amount of about 0.04 mole per mole of methyl vinyl ether.

As mentioned above coating compositions of the invention preferably contain acid in amounts sufficient to maintain pH of the composition between about 1.5 and about 3. Acid for this purpose may be added as an additional ingredient or in some cases may be present in the water used in making the coating composition. In general any acid may be used which is sufficiently soluble in the coating composition to maintain the desired pH of the particular composition being formulated without having to be used in such large quantities that the desired physical properties of the composition are adversely affected. Acid, when used, is generally used in amounts between about 2 and about 15 wt. % based on total coating composition. Especially preferred acids include oxalic, tannic, phosphoric and citric acids. Of these citric acid is the acid of choice for many applications due to its price, availability and ease of handling. A partial list of suitable acids includes for instance the following acids: Organic Acids—Acetic, Acetoacetic, Acrylic, Ascorbic, Butyric, Citric, Formic, Glutaric, Lactic, Maleic, Malic, Oxalic, Tannic, Tartaric; Inorganic Acids—Hydrochloric, Nitric, Phosphoric and Sulfuric.

In formulating compositions of the invention higher concentrations of PVP in general increase viscosity of the composition and lower the flow rate while lower concentrations make it easier to prepare and apply the coating compositions. The choice of a particular concentration of PVP for use in a given application of the invention frequently involves some degree of trade-off between these various desirable properties. The thixotropic properties of the composition are determined by the amount of thixotropic agent used and also enter into any decisions to be made in this respect. Likewise use of acid, especially in amounts sufficient to maintain low pH, may enhance rust removal but may also tend to plasticize the dried film and leave a residue on the metal substrate. In general a highly thixotropic formulation is necessary to minimize drippage of material applied to inclined or overhead surfaces while retaining other desired properties.

Spreadable thixotropic coating compositions of the invention may be prepared in any suitable manner. One suitable method is for instance to thoroughly dry blend PVP, thixotropic agent and acid (if used) and add to water while stirring. This liquid formulation may then be heated to a temperature of e.g. 80°–100° C. for e.g. 1–3 hours to improve solvation. Another suitable technique is to add a well-mixed dry blend of PVP, interpolymer and acid (if used) to boiling water and maintain the temperature at about 80°–100° C. for about 1–4 hours. Another method of preparation involves addition of thixotropic agent and acid (if used) to a solution of PVP heated in a water bath. This formulation may be allowed to stand at ambient temperature for several days. Once formed, coating compositions of the invention are relatively stable, but for best thixotropic effect should be preferably used within about 60 days, more preferably within about 30 days of manufacture since solvation continues to some extent. During storage the composition should be kept in closed containers since these compositions are air drying.

In practicing the process of the invention it is generally preferred that the coating compositions be applied to the rusty surface in a thickness of at least about 0.6 mm (25 mil), more preferably between about 1.3 and about 2.5 mm. For heavily rusted surfaces it is preferred that the coating be at least about 1.3 mm thick to ensure substantially complete removal of rust. Coatings applied in the preferred thicknesses will under most normal conditions be removable in periods of time between about 6 and about 30 hours. Drying time and hence removal time depends primarily upon coating composition and thickness as well as temperature and humidity conditions. Thicker coatings are satisfactory, but require longer drying times. Atmospheric humidity also has an effect upon the properties of the dried coating. At low humidities (below about 40–60% relative humidity) the coating tends to dry to a hard brittle film which tends to crack and detach itself from the metal surface. Under these conditions little or no additional effort is required to remove the rust laden coating. In extreme cases the coating may merely be allowed to drop from overhead surfaces or may be blown or lightly brushed to remove from the metal surfaces. At higher levels of humidity, e.g. 60-75%, the coating tends to become somewhat plasticised by absorption of water. The resulting dried film may be detached from the metal surface in large chunks using a spatula or putty knife. At higher humidities, e.g. above 75-80%, the tendency is for the coating to dry to a soft pliable film which can be easily peeled from the metal surface as an integral unit. Film properties in general vary from extremely hard and brittle at e.g. 40% humidity and lower to soft and pliable at e.g. 85% relative humidity or higher. The exact method preferred for removing the dried rust laden film will depend largely upon the film properties. As mentioned these are largely dependent upon the relative humidity involved. Even at low levels of humidity it may sometimes be desired to remove the coating in the form of a soft, pliable film. This may be accomplished by removing the coating before it is completely dry.

Another factor effecting ease of removal of film is that of film thickness. Below a threshold level of application thickness the resulting dried film cannot be removed. Above this threshold level the easier the film is to remove, but the longer the drying time. For preferred formulations in accordance with the invention the threshold thickness appears to vary between about 0.4 and about 0.6 mm depending upon the exact composition of the coating.

The following example is intended to illustrate the invention without limiting the scope thereof.

EXAMPLE I

An especially preferred coating composition of the invention was prepared by thoroughly dry blending the ingredients in the weight percentages stated below.

| Ingredient | Weight Percent |
|---|---|
| PVP K-90 | 20% |
| GAFTEX PT | 7% |
| Citric Acid | 5% |
| Water | 68% |

Once these ingredients were dry blended, the blend was added with stirring to water at 80°-100° C. temperature. Heat was applied for one hour to maintain the aqueous mixture at 80°-100° C. The resulting gelatinous white paste had a pH of 2.2 a negligible glass plate flow rate and a negligible glass plate flow distance. To test the composition for rust removal capability, a 1.27 mm thick layer was coated by a metal blade onto a rusted steel plate. The coating was then allowed to dry for 6-8 hours at a relative humidity (RH) 55-60 percent. At the end of this drying period, the flexible, rubbery coating was easily peeled from the metal surface. Rust was not visible on the metal surface which had been cleaned by this coating.

EXAMPLE II

A rust removal coating composition was prepared as stated in Example I. This coating was applied at a thickness of 1.27 mm by a metal blade onto a rusted steel plate. The coating was then allowed to dry for 25 hours at 20°-25° C. and 30-35% relative humidity. At the end of this drying period, the coating was cracking from the metal surface and was easily pulled off in pieces of about 12 mm average size, leaving the metal surface free of rust. The dried coating of this example was considerably harder and more brittle than the coating of Example I.

EXAMPLE III

A rust removal coating composition was prepared by thoroughly dry blending ingredients in the weight percentages stated below:

| Ingredient | Weight Percent |
|---|---|
| KVP K-90 | 20% |
| Xanthan gum | 10% |
| Citric Acid | 5% |
| Water | 65% |

Once these ingredients were dry blended, the blend was added with stirring to water at 80°-100° C. temperature. The mixture was heated for 4 hours to maintain a temperature between 80°-100° C. The resulting gelatinous paste had a negligible glass plate flow rate and negligible glass plate flow distance.

To test the composition for rust removal capability, a 1.27 mm thick layer was coated onto a rusted steel plate by using a metal blade. The coating was then allowed to dry until it cracked and detached from the metal surface. Humidity was between 20-25% R.H. Temperature was between about 20° and about 25° C.

While the invention has been described above with respect to preferred embodiments thereof, it will be understood by those skilled in the art that various changes and modifications may be made without departing from the spirit or scope of the invention.

What is claimed is:

1. A spreadable thixotropic coating composition having a pH between 1.5 and 7.0 said composition being suitable for removing rust from metal surfaces and consisting essentially of:
   (a) an effective film forming and rust removing amount of polyvinylpyrrolidone;
   (b) an effective solvent amount of water; and
   (c) an effective thixotropic amount of thixotropic agent selected from the group consisting of xanthan gum and water-soluble crosslinked interpolymer consisting essentially of substantially equimolar quantities of maleic anhydride and monovinyl alkyl ether wherein the alkyl group contains from 1 to 4 carbon atoms and 0.001 to 0.2 mole per mole of the monovinyl alkyl ether of a crosslinking agent having a formula selected from the class consisting of $$H_2C=CH-O-X_1-OCH=CH_2$$

and $$H_2C=CH(OX_2)_nOCH=CH_2$$

where $X_1$ represents an alkylene group of two to twelve carbon atoms and $X_2$ represents an alkylene group of two to four carbon atoms and n represents an integer of 2 to 100.

2. A thixotropic coating composition according to claim 1 which has a pH between about 1.5 and about 3 and which contains:

(a) between about 10 and about 40 wt % polyvinylpyrrolidone;
(b) between about 30 and about 85 wt % water;
(c) between about 3 and about 15 wt % thixotropic agent; and
(d) between about 2 and about 15 wt % acid.

3. A thixotropic coating composition according to claim 2 wherein the thixotropic agent is said interpolymer and the monovinyl alkyl ether is methyl vinyl ether.

4. A thixotropic coating composition according to claim 2 wherein the thixotropic agent is said interpolymer and the monovinyl alkyl ether is ethyl vinyl ether.

5. A thixotropic coating composition according to claim 2 wherein the thixotropic agent is said interpolymer and the crosslinking agent has the formula $$CH_2=CH-O-X_1-O-CH=CH_2$$

wherein $X_1$ represents a butylene group.

6. A thixotropic coating composition according to claim 2 wherein the thixotropic agent is said interpolymer and the crosslinking agent has the formula $$CH_2=CH(OX_2)_nOCH=CH_2$$

and $X_2$ is ethylene and n is 2.

7. A thixotropic coating composition according to claim 2 wherein the acid is selected from the group consisting of citric, oxalic, tannic and phosphoric acids.

8. A thixotropic coating composition according to claim 2 wherein the polyvinylpyrrolidone has a K value between about 30 and about 90.

9. A thixotropic coating composition according to claim 2 which has a glass flow rate of not more than about 1 mm per minute and a glass plate flow distance of not more than about 12 mm.

10. A thixotropic coating composition according to claim 2 wherein (a) the monovinyl alkyl ether is methyl vinyl ether;
(b) the thixotropic agent is said interpolymer and the crosslinking agent has the formula $$CH_2=CH-O-X_1-O-CH=CH_2$$

wherein $X_1$ represents a butylene group;
(c) the acid is citric acid;
(d) the polyvinylpyrrolidone has a K value between about 30 and about 90; and
(e) the coating composition has a glass plate flow rate of not more than about 1 mm and a glass plate flow distance of not more than about 12 mm.

11. Process for removing rust from a rusty metal surface which comprises:

(a) applying thixotropic coating composition of claim 1 to said surface to form a coating thereon;
(b) allowing said coating to dry, whereby rust becomes incorporated into the coating; and
(c) removing the dried coating containing rust from the metal surface.

12. Process according to claim 11 wherein the coating composition is according to claim 2 and has a glass plate flow rate of not more than about 1 mm per minute and a glass plate flow distance of not more than about 12 mm.

13. Process according to claim 12 wherein the coating is at least about 0.6 mm thick and is allowed to dry for at least about 6 hours.

14. Process according to claim 12 wherein the thixotropic agent is said interpolymer and (a) the monovinyl alkyl ether is methyl vinyl ether;
(b) the crosslinking agent has the formula:

$$CH_2=CH-O-X_1-O-CH=CH_2$$

wherein $X_1$ represents a butylene radical; and
(c) the acid is citric acid.

* * * * *